April 24, 1962  H. FISCHER  3,031,166
DRAIN COCKS
Filed March 11, 1960
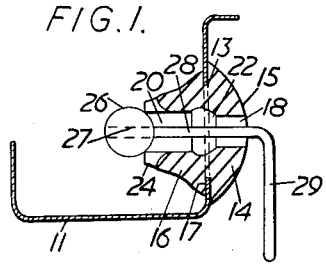
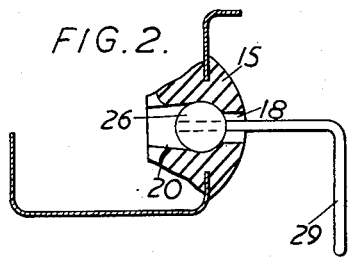
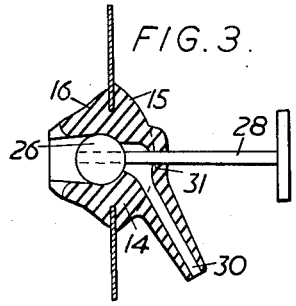
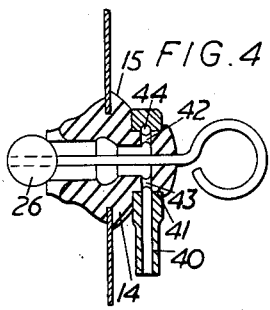
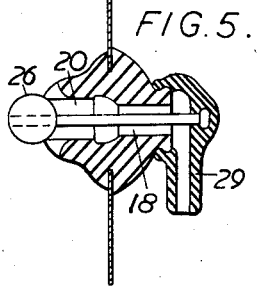
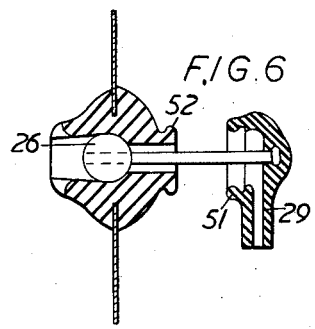
Inventor
Hans Fischer
By E. W. Christew
Attorney

United States Patent Office 3,031,166
Patented Apr. 24, 1962

3,031,166
DRAIN COCKS
Hans Fischer, Russelsheim, Hesse, Germany, assignor to General Motors Corporation, Detroit, Mich., a corporation of Delaware
Filed Mar. 11, 1960, Ser. No. 14,278
Claims priority, application Germany Mar. 13, 1959
8 Claims. (Cl. 251—320)

This invention relates to drain cocks for fluid containers, and in particular for fluid containers, such as the radiators of internal combustion engines, which have thin walls.

Shut-off cocks made of metal have been used as drain cocks for radiators on motor road vehicles, the cock generally being screwed into or soldered to the bottom tank of the radiator. Such drain cocks commonly consist of a cast valve body of metal in which a ground conical valve plug is rotatably mounted. The valve body and plug have to be carefully machined to provide a fluid-tight fit between the plug and valve body.

A drain cock according to the invention does not require machining and its parts may be made by injection moulding or die casting; and the drain cock is mounted in the fluid container, such as the bottom tank of a motor road vehicle radiator, by pressing the cock into the drain opening of the tank.

According to the invention a drain cock for a liquid container comprises a resiliently deformable axially bored mushroom shaped valve body adapted to be press fitted into a drain opening in the container, and a spherical plug which can be manually pressed into or out of the axial bore of the valve body to close or open the cock.

The central bore of the valve body preferably has a larger diameter inlet portion and a smaller diameter outlet portion which are axially spaced by an annularly grooved portion adapted to form a valve seat for the plug in the closed position of the cock. The surface of the seat is preferably substantially that of a spherical zone.

The valve body and the plug, may be made from natural rubber, or synthetic rubber or like synthetic elastomeric material.

The head of the mushroom-shaped valve body preferably has an external annular groove adapted to engage and form a seal with the edge of the drain opening of the container.

The scope of the invention is defined by the appended claims; and the invention and the manner in which it is to be performed is hereinafter particularly described with reference to the accompanying drawings, in which:

FIGURE 1 is a vertical section of a drain-cock according to the invention, in its open position;

FIGURE 2 is a view similar to FIGURE 1, with the cock in the closed position;

FIGURE 3 is a vertical section of a modified form of drain cock incorporating a lateral drain conduit, the cock being shown closed;

FIGURE 4 is a vertical section of a further modified form of drain cock which has a detachable drain conduit and is shown in the open position;

FIGURE 5 is a vertical section of yet another modified form of drain cock having an actuator handle which also serves as a drain conduit, the cock being shown in the open position; and FIGURE 6 is a view similar to FIGURE 5, with the cock in the closed position.

The drain cock shown in FIGURES 1 and 2 is arranged in the wall 11 of the bottom tank of the radiator of a motor road vehicle, the tank having a drain opening 13. The drain cock has a body 14 which is mushroom shaped and made of resiliently deformable material such as natural or synthetic rubber, or other synthetic elastomeric plastics material which can be die cast or injection moulded. Such material should, in addition to being resilient, be resistant to the action of water up to a temperature of 140° C., and to the action of the normally used "anti-freeze" radiator liquid additives, and to oil.

The valve body 14 has a rounded head 15 and a tapered stem 16, there being an external annular groove 17 between the head 15 and stem 16. The width of the groove is preferably slightly less than the thickness of the tank wall 11.

The valve body 14 has a central bore 18, 20 coaxial with the head 15 and stem 16, the part 20 of the bore (within the tank 11) being larger in diameter than the part 18 (outside the tank 11) and the two parts being axially spaced by an annular groove 22 the surface of which is substantially that of a spherical zone. The inner end of the stem 16 adjacent the end of the bore 20 has two or more axial projections 24.

The valve is closable by a spherical plug 26 which is preferably made of similar material to the valve body 14 and has a diameter slightly greater than that of the inner bore portion 20. A metal rod or wire 28 is secured in a bore 27 in the plug 26 and the wire 28 is bent at right angles so as to form a handle 29.

The drain-cock is attached to the tank 11 by inserting the stem 16 into the opening 13 and then applying axial pressure to the head 15 of the valve body 14 so as to force the valve body inwardly of the tank until the edge wall of the tank about the opening 13 is engaged in the external annular groove 17 of the valve body 14.

When the handle 29 is pressed inwardly, as shown in FIGURE 1, the spherical plug 26 is seated on the projections 24 so that there is a clearance space between the plug 26 and the ends of the bore 20 to enable liquid to flow from the tank and into the bore 18, 20. If the handle 29 is pulled outwardly the portion of the valve body including the projections 24 and the stem portion 16 are resiliently stretched by the plug 26 which is moved axially of the bore portion 20 and comes to seat in the annular groove 22 between the larger and smaller diameter portions 20, 18 of the central bore. The elasticity of the material of the valve body 14 ensures that the plug 26 is pressed against the seat in the groove 22 so as to form a liquid tight seal therewith and close the outlet formed by the smaller diameter portion 18 of the central bore of the valve body 14. The closed position of the drain cock is shown in FIGURE 2.

The drain cock shown in FIGURE 3 is of generally similar construction as that shown in FIGURES 1 and 2 but in this embodiment the valve body 14 has a head 15 which is extended to form a tubular drain conduit 30. The wire or rod 28 which forms a handle extends through a bore 31 in a wall of the drain conduit 30.

FIGURE 4 shows another embodiment of the drain cock in which a member forming a drain conduit 40 is formed as a separate part which seats on a cylindrical extension 41 of the head 15 of the valve body 14. The extension 41 has one or more outlet ports 42, 43 which open into an annular channel 44 in communication with the drain conduit 40. The drain conduit 40 is preferably made of the same material as the valve body 14 and is resiliently stressed so as to be secured in position on the head 15.

In a further embodiment of the invention shown in FIGURES 5 and 6 a handle 29 for actuating the plug 26 is made hollow so as also to act as a drain conduit. The The handle 29 has a beaded annular lip 51 which is resiliently engaged over a complementary annular bead 52 around an extension of the portion 18 of the axial bore of the valve body 14. When the handle 29 is engaged with the valve body 14 the conduit in the handle 29 is in communication with the central bore 18, 20 of the valve body. FIGURE 6 shows the position of the handle and the plug 26 when the drain cock is in its closed position.

A drain cock according to the invention, although suitable in particular for use with the radiators of internal combustion engines for motor road vehicles may also be used in other cases in which a drain cock has to be incorporated in a thin walled container for fluids.

I claim:

1. A drain cock comprising a mushroom-shaped valve body made of elastomeric material and consisting of a head and an integral stem with a coaxial bore therethrough, said stem being adapted to fit in a drain opening of a thin-walled liquid container, a spherical plug movable axially of said bore from a first position clear of said bore to a second position within the bore to close said bore against fluid flow therethrough, a rod member secured at one end to said plug for actuation thereof, and a handle at the other end of said rod for actuation of said plug, said bore having a larger diameter portion in said stem and a smaller diameter portion in said head, and said bore portions being connected by a portion of the bore the surface of which is substantially that of a spherical zone and in which said plug seats in said second position.

2. A drain cock according to claim 1, in which said plug body is made of a material selected from the group comprising natural rubber or synthetic rubber-like material.

3. A drain cock according to claim 2, in which the head of said valve body has an external annular groove therein adapted to engage and form a seal with the edges of said drain opening.

4. A drain cock according to claim 3, in which the head of said valve body has an integral tubular extension which is in communication with the narrower diameter portion of said bore and constitutes an outlet conduit, said rod slidably extending through the wall of said conduit.

5. A drain cock comprising a mushroom-shaped valve body made of elastomeric material and consisting of a head and an integral stem with a coaxial bore therethrough, said stem being adapted to fit in a drain opening of a thin-walled liquid container; a spherical plug movable axially of said bore from a first position clear of said bore to a second position within the bore to close said bore against fluid flow therethrough; a rod member secured at one end to said plug for actuation thereof; a handle at the other end of said rod, said bore having a larger and a smaller diameter portion which are located respectively in said stem and said head and are connected by a bore portion which constitutes a valve seat and the surface of which is substantially that of a spherical zone, said plug being adapted to engage said valve seat in said second position of the plug; and said smaller diameter bore portion being closed by an integral extension of said head having therein radial passages in communication with said smaller diameter bore portion; and a drain conduit member fitted over said extension and having an outlet conduit in communication with said radial passages.

6. A drain cock comprising a mushroom-shaped valve body made of elastomeric material and consisting of a head and an integral stem with a coaxial bore therethrough, said stem being adapted to fit in a drain opening of a thin-walled liquid container; a spherical plug movable axially of said bore from a first position clear of said bore to a second position within the bore to close said bore against fluid flow therethrough; a rod member secured at one end to said plug for actuation thereof; said bore having a larger and a smaller diameter portion which are located respectively in said stem and said head and are connected by a bore portion which constitutes a valve seat and the surface of which is substantially that of a spherical zone, said plug being adapted to engage said valve seat in the said second position of the plug; a coaxial integral extension on said head; and a drain conduit member of elastomeric material resiliently engaged over said extension and having an outlet conduit adapted to communicate with said bore when said plug is in its first position, the other end of said rod being secured to said drain conduit member.

7. A drain cock comprising a mushroom shaped valve body made of elastomeric material and consisting of a head and an integral stem with a coaxial bore therethrough, said stem being adapted to fit in a drain opening of a thin-walled liquid container and said bore having a larger diameter and a smaller diameter portion which are located respectively in said stem and said head and are connected by a bore portion which constitutes a valve seat and the surface of which is that of a spherical zone; and a spherical plug movable axially of said bore from a first position clear of said larger diameter bore portion to a second position in which it forms a seal with said valve seat to close said smaller diameter bore portion against fluid flow therethrough, said plug being of a size to resiliently stretch said larger diameter bore portion when the plug is moved to its second position.

8. A drain cock according to claim 7, in which said plug is made of similar material to said valve body.

References Cited in the file of this patent

UNITED STATES PATENTS

| | | |
|---|---|---|
| 1,997,955 | Weaver | Apr. 16, 1935 |
| 2,106,671 | Watson | Jan. 25, 1938 |
| 2,646,073 | Schor | July 21, 1953 |
| 2,887,120 | De See | May 19, 1959 |
| 2,931,178 | Straus | Apr. 5, 1960 |
| 2,946,342 | Dopplmaier | July 26, 1960 |

FOREIGN PATENTS

| | | |
|---|---|---|
| 274,275 | Switzerland | June 16, 1951 |
| 1,127,112 | France | Aug. 6, 1956 |